' US009745928B2

United States Patent
Honda

(10) Patent No.: US 9,745,928 B2
(45) Date of Patent: Aug. 29, 2017

(54) PRESSURE ADJUSTER

(71) Applicant: AISAN KOGYO KABUSHIKI KAISHA, Obu-shi (JP)

(72) Inventor: Yoshihiko Honda, Obu (JP)

(73) Assignee: AISAN KOGYO KABUSHIKI KAISHA, Obu-shi (JP)

( * ) Notice: Subject to any disclaimer, the term of this patent is extended or adjusted under 35 U.S.C. 154(b) by 46 days.

(21) Appl. No.: 15/011,782

(22) Filed: Feb. 1, 2016

(65) Prior Publication Data
US 2016/0222930 A1    Aug. 4, 2016

(30) Foreign Application Priority Data

Feb. 3, 2015   (JP) ................. 2015-019667

(51) Int. Cl.
*F02M 37/00*   (2006.01)
*F16K 15/02*   (2006.01)

(52) U.S. Cl.
CPC .... *F02M 37/0029* (2013.01); *F02M 37/0082* (2013.01); *F16K 15/026* (2013.01)

(58) Field of Classification Search
CPC ............ F02M 37/0052; F02M 37/025; F02M 37/0023; F02M 37/0029; F02M 37/0082; F16K 15/026
USPC .................. 123/510, 511, 514; 417/189, 187
See application file for complete search history.

(56) References Cited

U.S. PATENT DOCUMENTS

| 4,621,603 A * | 11/1986 | Matekunas ........... F02D 35/023 123/435 |
| 5,967,119 A * | 10/1999 | Burkhard ............... F02M 69/54 123/458 |
| 6,341,623 B1 * | 1/2002 | Channing ............ B60K 15/077 123/514 |
| 7,717,091 B2 * | 5/2010 | Aoki .................. F02M 37/0029 123/511 |
| 8,276,568 B2 * | 10/2012 | Takagi ................ F02D 41/0025 123/458 |

(Continued)

FOREIGN PATENT DOCUMENTS

JP    2009-121436 A    6/2009
JP    2012-202382 A    10/2012

(Continued)

*Primary Examiner* — Thomas Moulis
(74) *Attorney, Agent, or Firm* — Shumaker, Loop & Kendrick, LLP

(57) ABSTRACT

A pressure adjuster may connect with a supply path connecting a fuel supply device and a fuel use device. The pressure adjuster may comprise a pressure chamber communicating with the supply path located closer to the fuel supply device than a check valve of the supply path, a communication chamber communicating with the supply path located closer to the fuel use device than the check valve, a valve member including a first pressure-receiving surface and switching between an open state and a closed state by pressure of fuel inside of the pressure chamber at the first pressure-receiving surface, a discharge path communicating with the communication chamber and configured to discharge fuel flowing from the communication chamber to outside of the casing when the valve member is in the open state, and a constriction portion disposed in the discharge path and constricting a cross section area of the discharge path.

9 Claims, 11 Drawing Sheets (First Embodiment)

(56) References Cited

U.S. PATENT DOCUMENTS

| | | | |
|---|---|---|---|
| 8,333,175 B2* | 12/2012 | Nishio | F02M 37/0029 |
| | | | 123/458 |
| 8,517,050 B2* | 8/2013 | Akagi | F02M 37/0029 |
| | | | 123/511 |
| 8,567,373 B2* | 10/2013 | Suda | F02D 33/006 |
| | | | 123/457 |
| 8,695,571 B2* | 4/2014 | Suzuki | F02M 37/0029 |
| | | | 123/457 |
| 2005/0188954 A1* | 9/2005 | Yoshino | F02D 35/025 |
| | | | 123/406.29 |
| 2009/0126698 A1 | 5/2009 | Aoki | |
| 2011/0297126 A1* | 12/2011 | Akagi | F02M 37/0029 |
| | | | 123/457 |
| 2012/0312395 A1 | 12/2012 | Suzuki et al. | |
| 2014/0165977 A1* | 6/2014 | Copley | B01D 45/08 |
| | | | 123/573 |
| 2015/0307076 A1* | 10/2015 | Leone | F02D 19/024 |
| | | | 701/54 |

FOREIGN PATENT DOCUMENTS

| | | |
|---|---|---|
| JP | 2013-127220 A | 6/2013 |
| WO | 2011099055 A1 | 8/2011 |

* cited by examiner (First Embodiment)

(First Embodiment)

(Second Embodiment)

(Third Embodiment)

(Fourth Embodiment)

(Fifth Embodiment)

(Sixth Embodiment)

(Seventh Embodiment)

PRESSURE ADJUSTER

CROSS-REFERENCE TO RELATED APPLICATION

This application claims priority to Japanese Patent Application No. 2015-019667 filed on Feb. 3, 2015, the entire contents of which are hereby incorporated by reference into the present application.

TECHNICAL FIELD

The present application relates to a pressure adjuster configured to connect with a supply path connecting a fuel supply device and a fuel use device.

BACKGROUND

Japanese Patent Application Publication No. 2012-202382 A discloses a technology for supplying an engine with fuel from a fuel pump unit configured to change a discharge amount of fuel per unit time. A supply path between the fuel pump unit and the engine includes a check valve. The check valve opens in a fuel supply direction from the fuel pump unit toward the engine, and closes in the opposite direction thereto. Connected to the supply path is a pressure regulator.

The pressure regulator includes an introductory passage connected to a side of the supply path downstream of the check valve, an operating pressure supply and discharge passage connected to a side of the supply path upstream of the check valve via a three-way valve, and a discharge passage through which the fuel is discharged into a fuel tank. The three-way valve switches between a supply state in which the operating pressure supply and discharge passage communicates with the side of the supply path upstream of the check valve and a discharge state in which the operating pressure supply and discharge passage communicates with the inside of the fuel tank. The introductory passage, the operating pressure supply, and the discharge passage communicate with one another when a valve member opens, and are isolated from one another when the valve member closes. The valve member receives pressure of fuel inside of the introductory passage and pressure of fuel inside of the operating pressure supply and discharge passage when the three-way valve is in the supply state, and receives pressure of fuel inside of the introductory passage when the three-way valve is in the discharge state. As a result, in a case where the three-way valve is in the supply state, the valve member opens with the pressure inside of the supply path being comparatively low. The above technology is a technology for adjusting the pressure inside of the supply path by switching the three-way valve between the supply state and the discharge state.

SUMMARY

In a case where an amount of fuel that is used by a fuel use device such as an engine per unit time is small, a check valve does not sufficiently open, which causes abnormal noise and/or wearing of the check valve.

The present disclosure provides a technology that a check valve sufficiently opens even in a case where an amount of fuel that is used by a fuel use device per unit time is small.

The technique disclosed herein in one aspect relates to a pressure adjuster configured to connect with a supply path connecting a fuel supply device and a fuel use device. The fuel supply device may be configured to change a supply amount of fuel per unit time. The supply path may include a check valve configured to allow fuel to flow in the supply path from the fuel supply device to the fuel use device and inhibits fuel from flowing in the supply path from the fuel use device to the fuel supply device. The pressure adjuster may comprise a casing, a pressure chamber, a communication chamber, a valve member, a discharge path, and a constriction portion. The pressure chamber may be disposed in the casing and communicates with the supply path located on a side closer to the fuel supply device than the check valve. The communication chamber may be disposed in the casing and communicates with the supply path located on a side closer to the fuel use device than the check valve, and may be isolated from the pressure chamber. The valve member may be disposed in the casing, includes a first pressure-receiving surface, and may be configured to switch between an open state and a closed state by pressure of fuel inside of the pressure chamber at the first pressure-receiving surface. The discharge path may communicate with the communication chamber and is configured to discharge fuel flowing from the communication chamber to outside of the casing when the valve member is in the open state. The discharge path may be isolated from the pressure chamber. The constriction portion may be disposed in the discharge path and may be configured to constrict a cross section area of the discharge path.

In the above configuration, the valve member switches from the closed state to the open state by pressure of fuel upstream of the check valve. As a result, in a case where the valve member is in the open state, fuel inside of the supply path reaches the discharge path via the communication chamber from a downstream side of the check valve. This configuration allows a larger amount of fuel than is used by the fuel use device to pass through the check valve even in a case where an amount of fuel that is used by the fuel use device per unit time is small. The check valve sufficiently opens in the case where the amount of fuel that is used by the fuel use device per unit time is small.

DETAILED DESCRIPTION

Figure 1:
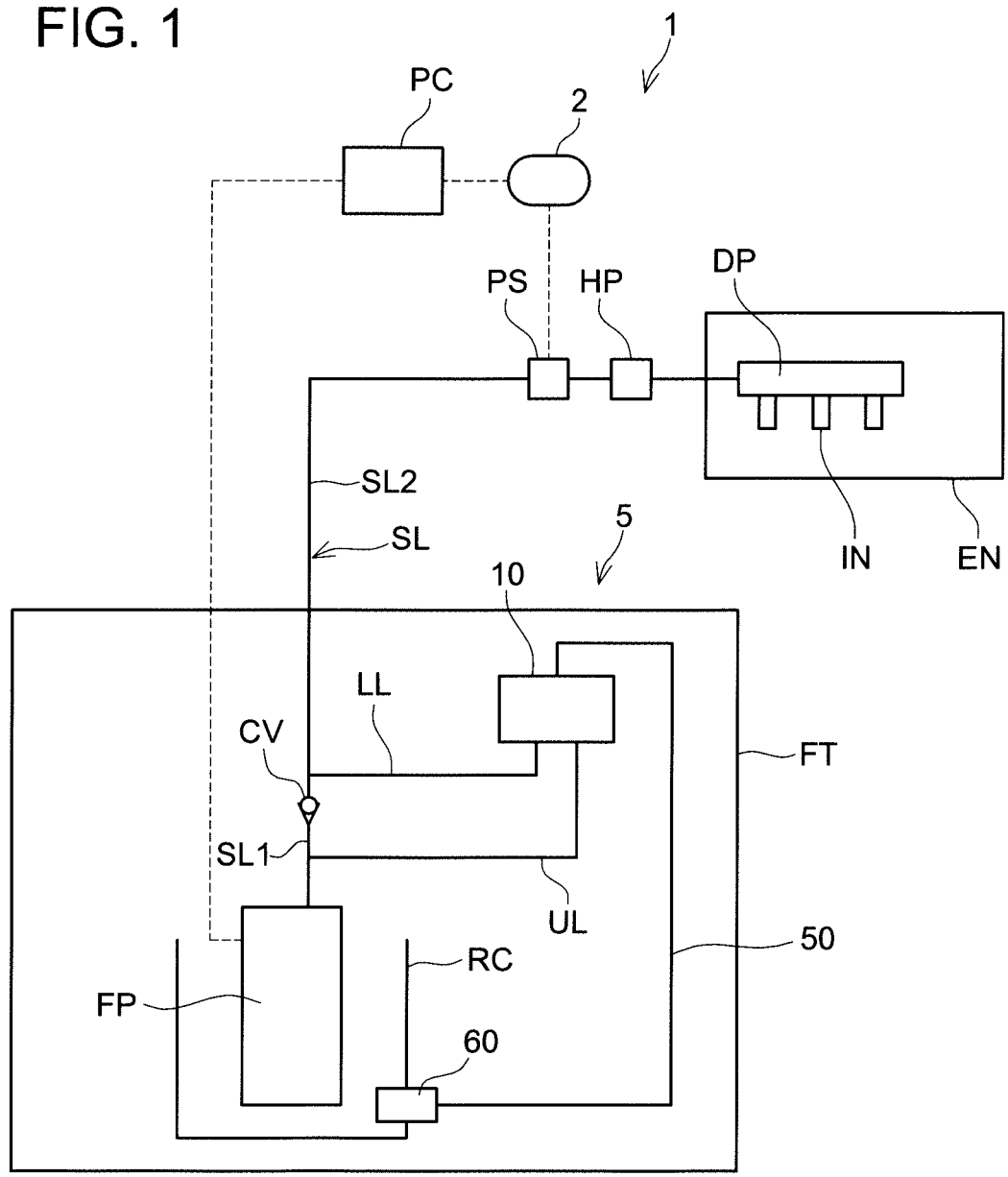
FIG. 1 is a schematic view of a fuel supply system.

Some features of embodiments described herein will be listed. Notably, technical features described herein are each independent technical element, and exhibit technical usefulness thereof solely or in combinations.

(Feature 1) In a pressure adjuster, the valve member may comprise a valve portion integrally connected to the first pressure-receiving surface and disposed between the communication chamber and the discharging path. This configuration allows the valve member to have a simple structure.

(Feature 2) In the pressure adjuster, the valve member may be configured to slide along an inner circumference surface of the casing in the casing. The casing may comprise a contact portion configured to make contact with the valve member when the valve member is in the open state. The contact portion may comprise a seal portion disposed on a downstream side of the valve member and a downstream side of a slide part where the valve member slides on the casing. This configuration makes it possible to, in the open state, suppress a leakage of fuel out of the casing through the slide part where the valve member slides on the casing.

(Feature 3) The pressure adjuster may further comprise a warping member connecting an inner circumference surface of the casing and the valve member and configured to warp by pressure of fuel inside of the pressure chamber. The pressure chamber may be defined by the casing, the warping member and the valve member. This configuration makes it possible to, while maintaining the pressure chamber liquid tight, dispose the valve member so that the valve member can move with respect to the casing.

(Feature 4) In the pressure adjuster, the constriction portion may comprise a jet pump configured to intake fuel outside of the jet pump and discharge the fuel to the outside by utilizing a velocity of fuel flowing from the discharge path into the jet pump. This configuration allows the constriction portion to function as the jet pump by utilizing the fuel discharged from the pressure adjuster.

(Feature 5) The pressure adjuster may further comprise a first relief valve disposed in the casing and configured to adjust pressure of fuel inside of the discharge path. This configuration eliminates a need to dispose a relief valve at an intermediate position in the discharge path separately from the casing.

(Feature 6) The pressure adjuster may further comprise a second relief valve configured to adjust pressure of fuel inside of the pressure chamber. This configuration makes it possible to, in a case where a larger amount of fuel is discharged from the fuel pump than is used by the fuel use device, discharge fuel through the second relief valve and thereby reduce a load applied to piping of the fuel pump and the supply path due to a rise in pressure of fuel inside of the pipes of the fuel pump and the supply path.

(Feature 7) In the pressure adjuster, the valve member may further include a second pressure-receiving surface configured to receive pressure of fuel inside of the communication chamber. The first pressure-receiving surface may be larger than the second pressure-receiving surface. This configuration makes it possible to, in a case where pressure of fuel inside of the supply path on a downstream side of the check valve becomes comparatively high, switch the valve member from the closed state to the open state even in a case where pressure of fuel inside of the supply path on an upstream side of the check valve is low. This makes it possible to, while the fuel use device stops use of fuel, maintain the pressure of the fuel inside of the supply path on the downstream side of the check valve at such a pressure that the valve member is not switched to the open state.

Representative, non-limiting examples of the present invention will now be described in further detail with reference to the attached drawings. This detailed description is merely intended to teach a person of skill in the art further details for practicing preferred aspects of the present teachings and is not intended to limit the scope of the invention. Furthermore, each of the additional features and teachings disclosed below may be utilized separately or in conjunction with other features and teachings to provide improved pressure adjusters, as well as methods for using and manufacturing the same.

Moreover, combinations of features and steps disclosed in the following detailed description may not be necessary to practice the invention in the broadest sense, and are instead taught merely to particularly describe representative examples of the invention. Furthermore, various features of the above-described and below-described representative examples, as well as the various independent and dependent claims, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

First Embodiment

As shown in FIG. 1, a pressure adjuster 5 according to the present embodiment is used in a fuel supply system 1 (which is an example of a fuel supply device) that supplies fuel to an engine EN (which is an example of a fuel use device) of a vehicle such as an automobile. The fuel supply system 1 includes a fuel tank FT, a fuel pump FP, a supply path SL, a check valve CV, and a pump controller PC. In the fuel supply system 1, fuel stored in the fuel tank FT is supplied to the engine EN using the fuel pump FP. The fuel pump FP is accommodated in a reserve cup RC. The fuel pump FP raises pressure of fuel inside of the reserve cup RC and discharges the pressure-raised fuel into the supply path SL.

The fuel having flowed into the supply path SL is supplied to a high-pressure pump HP through the check valve CV disposed in the supply path SL. In a case where fuel flows from the fuel pump FP to the engine EN, the check valve CV opens to allow the fuel to flow. On the other hand, in a case where fuel flows from the engine EN to the fuel pump FP, the check valve CV closes to inhibit the fuel from flowing. The high-pressure pump HP raises pressure of fuel that is supplied from the supply path SL and supplies the fuel to a delivery pipe DP of the engine EN. Pressure of fuel inside of the supply path SL is detected by a pressure sensor PS. The delivery pipe DP supplies the fuel to injectors IN. The injectors IN inject the fuel into an intake path and/or cylinder of the engine EN. This causes the engine EN to be driven.

The engine EN is controlled by an ECU (which is the abbreviation of "Engine Control Unit") 2. The ECU 2 controls the engine EN in accordance with an operation that a driver performs on the vehicle, such as accelerator position. The ECU 2 obtains the pressure of the fuel inside of the supply path SL from the pressure sensor PS. The ECU 2 controls the fuel pump FP so that an amount of fuel appropriate for the driving of the engine EN can be supplied. Specifically, the ECU 2 transmits, to the pump controller PC, a signal corresponding to the amount of fuel that is to be supplied to the engine EN. The pump controller PC applies, to the fuel pump FP, a driving voltage corresponding to the signal received from the ECU 2.

The fuel pump FP is driven by the driving voltage applied from the pump controller PC. In the fuel pump FP, a rotation speed of a motor inside the fuel pump FP is changed according to the driving voltage. This causes the fuel pump FP to change, according to the driving voltage, an amount of fuel that is discharged per unit time. This enables the fuel supply system 1 to change a supply amount of fuel per unit time that is supplied to the supply path SL.

The fuel supply system 1 further includes the pressure adjuster 5. The pressure adjuster 5 is disposed in the fuel tank FT. The pressure adjuster 5 includes a pressure adjustment valve 10, a discharge path 50, and a jet pump 60.

Figure 2:
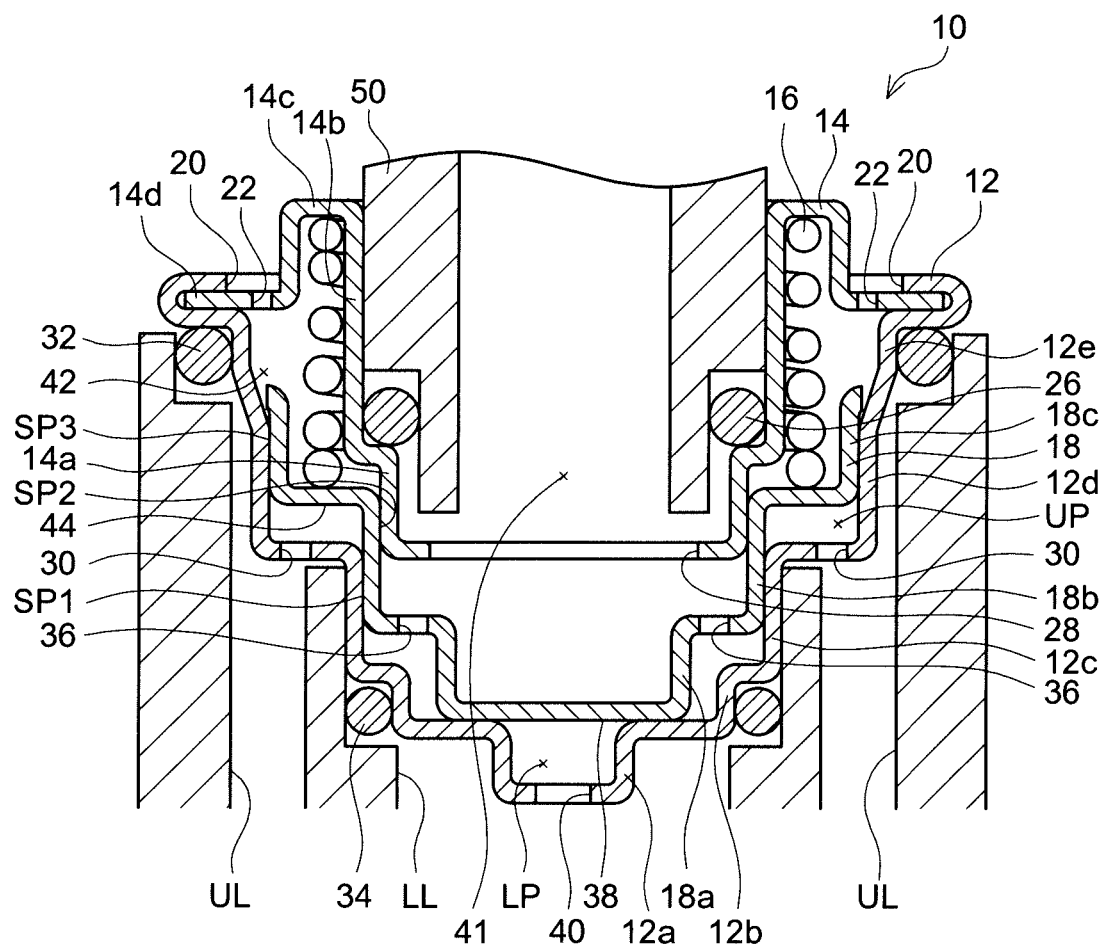
FIG. 2 is a longitudinal sectional view of a pressure adjustment valve in a closed state according to a first embodiment.

The pressure adjustment valve 10 is connected to the supply path SL. As shown in FIG. 2, the pressure adjustment valve 10 includes casings 12 and 14, a valve member 18, and a coil spring 16. The casing 12 is made by forming a metal plate such as a stainless steel plate. The casing 12 has an entirely uniform plate thickness. The casing 12 has five sections 12a to 12e continuously positioned from a lower end to an upper end of FIG. 2. The following will define an up/down orientation with reference to an up-and-down direction of FIG. 2.

The section 12a is located at a lowermost end of the casing 12. The section 12a has a bottomed cylindrical shape. A bottom of the section 12a includes an inlet 40 passing through the bottom of the section 12a in the up-and-down direction.

The section 12b is connected to an upper end of the section 12a. The section 12b has a bottomed cylindrical shape. The section 12b has a larger diameter than that of the section 12a. A bottom of the section 12b includes an opening communicating with the upper end of the section 12a.

The section 12c is connected to an upper end of the section 12b. The section 12c has a bottomed cylindrical shape. The section 12c has a larger diameter than that of the section 12b. A bottom of the section 12c includes an opening communicating with the upper end of the section 12b. The section 12d is connected to an upper end of the section 12c. The section 12d has a bottomed cylindrical shape. The section 12d has a larger diameter than that of the section 12c. A bottom of the section 12d includes an opening communicating with the upper end of the section 12c. Further, the bottom of the section 12d includes a plurality of communication holes 30 in a vicinity of its outer circumferential edge. The communication holes 30 pass through the bottom of the section 12d.

The section 12e is connected to an upper end of the section 12d. An outer shape of a lower end portion of the section 12e is a truncated conical shape of which outer diameter becomes larger upward. An inner diameter of the section 12e becomes larger upward as the outer diameter does. An upper end portion of the section 12e has a cylindrical shape. The sections 12a to 12e are integrally formed of a same material. The sections 12a to 12e are concentrically arranged.

The casing 14 is disposed at an upper end of the section 12e. The casing 14 is secured by the casing 12 having its upper end folded inward. The casing 14 is fixed to the casing 12. The casing 14 has its lower end disposed inside of the casing 12 and located at substantially a same level as the upper end of the section 12c. The casing 14 has its upper end protruding upward from an upper end opening 20 of the casing 12.

The casing 14 is made by molding a metal plate such as a stainless steel plate. The casing 14 has an entirely uniform plate thickness. The casing 14 has three sections 14a to 14c continuously positioned from the lower end to the upper end.

The section 14a is located at a lowermost end of the casing 14. The section 14a has a bottomed cylindrical shape. The section 14a is disposed coaxially with the sections 12a to 12e. An outer radius of the section 14a is smaller than an inner radius of the section 12c. Specifically, the outer radius of the section 14a is smaller than the inner radius of the section 12c by a same length as a plate thickness of the valve member 18, which will be described later.

A bottom of the section 14a includes an opening 28 passing through the casing 14 in the up-and-down direction. The opening 28 is larger than the inlet 40. The section 14a has its lower end located at substantially the same level as the upper end of the section 12c. The section 14a has its upper end located at an intermediate position of the section 12d in the up-and-down direction.

The section 14b is connected to an upper end of the section 14a. The section 14b has a bottomed cylindrical shape. The section 14b has a larger diameter than that of the section 14a. A bottom of the section 14b includes an opening communicating with an upper end of the section 14b. The section 14b has its upper end protruding upward from the upper end opening 20 of the casing 12.

The section 14c is connected to an upper end of the section 14b. The section 14c has an annular shape. The section 14c is disposed in a shape of a flange outward from the upper end of the section 14b. Disposed at an outer circumferential edge of the section 14c is an inserted portion 14d. The inserted portion 14d extends downward from the outer circumferential edge of the section 14c and passes downward through the upper end opening 20. The inserted portion 14d has its lower end spread outward and secured by the casing 12. The sections 14a to 14c and the inserted portion 14d are integrally formed of a same material. The sections 14a to 14c and the inserted portion 14d are concentrically arranged.

The valve member 18 is disposed between the casings 12 and 14. The valve member 18 has three sections 18a to 18c continuously positioned from its lower end to upper end. The valve member 18 can move in the up-and-down directions between the casings 12 and 14. The section 18a is located at a lowermost end of the valve member 18. The section 18a has a bottomed cylindrical shape. The section 18a is disposed coaxially with the section 12a. The section 18a has a larger diameter than that of the section 12a. In a state where the valve member 18 is located at the lowermost position, a lower surface of a bottom of the section 18a makes contact with an upper surface of the bottom of the section 12b to close an upper end opening of the section 12a. This causes a downstream pressure chamber LP to be defined by the bottom of the section 18a and the section 12a. The section 18a is disposed in the section 12b and the section 12c. An outer circumference surface of the section 18*a* is spaced from an inner circumference surface of the section 12*b* and an inner circumference surface of the section 12*c*.

The section 18*b* is connected to an upper end of the section 18*a*. The section 18*b* has a bottomed cylindrical shape. The section 18*b* has a larger diameter than that of the section 18*a*. A bottom of the section 18*b* includes an opening communicating with the upper end of the section 18*a*. Further, the bottom of the section 18*b* includes a plurality of communication holes 36 in a vicinity of its outer circumferential edge. The communication holes 36 pass through the bottom of the section 18*b*. This causes a space above the valve member 18 to communicate with a space defined by the sections 12*b*, 12*c*, 18*a*, and 18*b* via the communication holes 36. The spaces communicating via the communication holes 36 are collectively referred to as "space 41".

An outer circumference surface of the section 18*b* is in surface contact with the inner circumference surface of the section 12*c* over an entire length along its circumferential direction. Further, an inner circumference surface of the section 18*b* is in surface contact with an outer circumference surface of the section 14*a* over the entire length in the circumferential direction above the place of contact with the section 12*c*. In a case where the valve member 18 moves up and down, the outer circumference surface of the section 18*b* and the inner circumference surface of the section 12*c* slide on each other at a slide position SP1, and the inner circumference surface of the section 18*b* and the outer circumference surface of the section 14*a* slide on each other at a slide position SP2. The section 18*b* has its upper end located at an intermediate position of the section 12*d*.

The section 18*c* is connected to an upper end of the section 18*b*. The section 18*c* has a bottomed cylindrical shape. The section 18*c* has a larger diameter than that of the section 18*b*. A bottom of the section 18*c* includes an opening communicating with the upper end of the section 18*b*. An outer circumference surface of the section 18*c* is in surface contact with an inner circumference surface of the section 12*d* over its entire length in its circumferential direction. In a case where the valve member 18 moves up and down, the outer circumference surface of the section 18*c* and the inner circumference surface of the section 12*d* slide on each other at a slide position SP3. A lower surface of the bottom of the section 18*c* is entirely spaced from an upper surface of the bottom of the section 12*d*. This causes a cylindrically-shaped upstream pressure chamber UP, outside of the valve member 18, to be defined by the section 18*b* and 18*c* and the section 12*d*.

Spaces inside of the casings 12 and 14 are divided by the valve member 18 into the downstream pressure chamber LP, the upstream pressure chamber UP, a space 42, and the space 41. The space 42 is located above the section 18*c*. The space 42 is defined by the section 12*e*, the sections 14*a* to 14*c*, and the section 18*c*. The space 42 is isolated from the space 41 at the slide position SP2, and is isolated from the upstream pressure chamber UP at the slide position SP3. Further, the space 42 communicates with the inside of the fuel tank FT via communication holes 22 arranged in the section 14*c* and the upper end opening 20. For this reason, pressure inside of the space 42 is equal to pressure of gas inside of the fuel tank FT. The space 42 is isolated from the upstream pressure chamber UP at the slide position SP3.

The coil spring 16 is disposed on an inner circumferential side of the section 18*c*. The coil spring 16 is disposed in the space 42 and between the valve member 18 and the casing 14. The coil spring 16 has its lower end in contact with an upper surface of the bottom of the section 18*c*. The coil spring 16 has its upper end in contact with a lower surface of the section 14*c* of the casing 14. The coil spring 16 biases the valve member 18 downward with respect to the casing 14. This causes a lower surface of the bottom of the section 18*a* to be pressed against and brought into surface contact with the upper surface of the bottom of the section 12*b*.

In a state where the lower surface of the bottom of the section 18*a* is pressed against the upper surface of the bottom of the section 12*b*, the downstream pressure chamber LP defined by the section 12*a* and the section 18*a* is isolated from the space 41 by the valve member 18. The state in which the lower surface of the bottom of the section 18*a* is pressed against the upper surface of the bottom of the section 12*b* is referred to as "closed state". As will be described in detail later, a state in which the lower surface of the bottom of the section 18*a* and the upper surface of the bottom of the section 12*b* are spaced from each other and the downstream pressure chamber LP and the space 41 communicate with each other is referred to as "open state".

The pressure adjustment valve 10 communicates with the supply path SL via an upstream line UL and a downstream line LL. The upstream line UL communicates with a side of the supply path SL upstream of the check valve CV, i.e., with an upstream path SL1 located closer to the fuel pump FP than the check valve CV. The downstream line LL communicates with a side of the supply path SL downstream of the check valve CV, i.e., with a downstream path SL2 located closer to the engine EN than the check valve CV.

The upstream line UL is attached to the section 12*e* of the casing 12 via an O-ring 32. The upstream line UL communicates with the upstream pressure chamber UP via the communication holes 30. The downstream line LL is disposed on an inner side of the upstream line UL. The downstream line LL is attached to the sections 12*b* and 12*c* via an O-ring 34. The downstream line LL communicates with the downstream pressure chamber LP via the inlet 40.

The pressure adjustment valve 10 further communicates with the discharge path 50. The discharge path 50 is inserted in the casing 14 and attached to the casing 14 via an O-ring 26. The discharge path 50 communicates with the space 41. That is, pressure of fuel inside of the discharge path 50 matches pressure of fuel inside of the space 41.

The jet pump 60 is disposed at an end of the discharge path 50. The jet pump 60 feeds fuel outside of the reserve cup RC into the reserve cup RC by utilizing a velocity of fuel that is supplied from the discharge path 50. A cross section area of the jet pump 60 is constricted to be smaller than that of the discharge path 50. This makes it possible for the velocity of fuel inside of the jet pump 60 to be raised to feed the fuel outside of the reserve cup RC into the reserve cup RC.

(Operation of the Pressure Adjuster 5)

The following will describe an operation of the pressure adjuster 5. In a situation where the fuel pump FP is being driven, fuel discharged from the fuel pump FP is supplied to the engine EN via the supply path SL. The fuel flowing through the supply path SL causes the check valve CV to open. The upstream path SL1 communicates with the upstream pressure chamber UP via the upstream line UL. Therefore, pressure of fuel inside of the upstream path SL1 and pressure of fuel inside of the upstream pressure chamber UP match. A pressure-receiving surface 44, which is the lower surface of the bottom of the section 18*c* of the valve member 18, receives the pressure of the fuel inside of the upstream pressure chamber UP. The pressure-receiving surface 44 extends forming a circle around the valve member 18 in a vicinity of an outer edge of the valve member 18. On account of this, the pressure of the fuel inside of the upstream pressure chamber UP causes a difference in pressure between the upstream pressure chamber UP and the space 42, thus applying an upward force to the pressure-receiving surface 44.

The downstream path SL2 communicates with the lower pressure chamber LP via the downstream line LL. Therefore, pressure of fuel inside of the downstream path SL2 and pressure of fuel inside of the downstream pressure chamber LP match. A pressure-receiving surface 38, which is the lower surface of the bottom of the section 18a of the valve member 18, receives the pressure of the fuel inside of the downstream pressure chamber LP. On account of this, the pressure of the fuel inside of the downstream pressure chamber LP applies an upward force to the pressure-receiving surface 38. It should be noted that an area of the pressure-receiving surface 38 is smaller than an area of the pressure-receiving surface 44.

Figure 3:
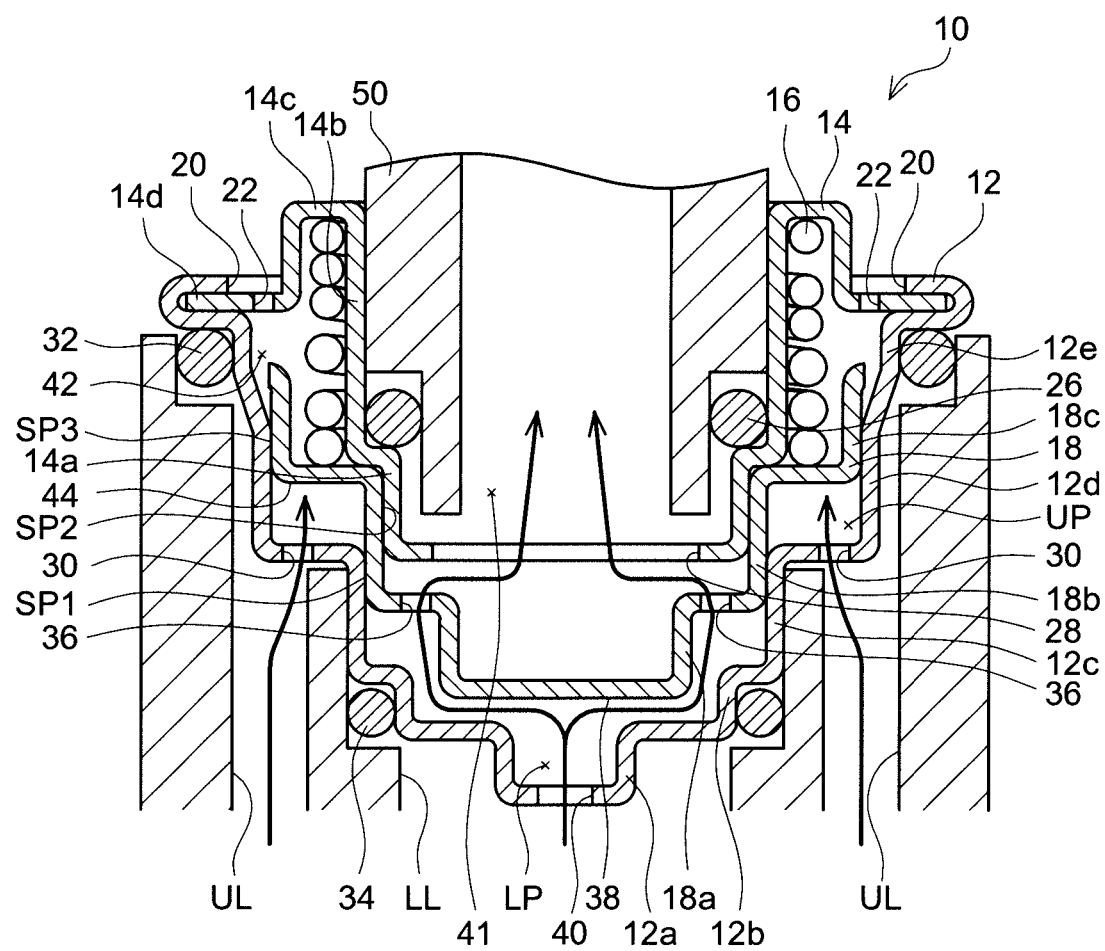
FIG. 3 is a longitudinal sectional view of the pressure adjustment valve in an open state according to the first embodiment.

While the check valve CV is open, the pressure of the fuel inside of the upstream path SL1 and the pressure of the fuel inside of the downstream path SL2 match. Accordingly, the pressure of the fuel inside of the upstream pressure chamber UP and the pressure of the fuel inside of the downstream pressure chamber LP match. Even when the pressure of the fuel inside of the upstream pressure chamber UP and the pressure of the fuel inside of the downstream pressure chamber LP match, force applied to the pressure-receiving surface 44 by the pressure of the fuel inside of the upstream pressure chamber UP is greater than force applied to the pressure-receiving surface 38 by the pressure of the fuel inside of the downstream pressure chamber LP. As shown in FIG. 3, in a case where the resultant force of the force applied to the pressure-receiving surface 44 and the force applied to the pressure-receiving surface 38 is greater than a biasing force that the coil spring 16 applies to the valve member 18, the pressure adjuster 10 shifts from the closed state to the open state. As a result of this, a volume of the upstream pressure chamber UP increases, so that fuel inside of the upstream line UL flows into the upstream pressure chamber UP. Since the upstream pressure chamber UP communicates only with the upstream line UL, no fuel flows in from the upstream line UL once the upstream pressure chamber UP is filled with the fuel.

In a case where the pressure adjustment valve 10 is in the open state, the downstream pressure chamber LP and the space 41 communicate with each other. This causes the supply path SL and the discharge path 50 to communicate with each other, so that a portion of the fuel discharged from the fuel pump FP reaches the jet pump 60 via the supply path SL, the pressure adjustment valve 10, and the discharge path 50. As a result of this, when the pressure adjustment valve 10 is in the open state, the fuel pump FP discharges a larger amount of fuel than is used by the engine EN. It should be noted that the jet pump 60 is comparatively small in cross section area and has a predetermined upper limit placed on the amount of fuel that it can discharge per unit time (e.g., 20 to 30 liters per hour). For this reason, when the pressure adjustment valve 10 is in the open state, the fuel pump FP can supply the engine EN with fuel by supplying the supply path SL with a larger amount of fuel per unit time than is discharged by the jet pump 60.

If the pressure adjuster 5 is not provided, the amount of fuel that is supplied from the fuel pump FP to the supply path SL in a case of a small amount of fuel that is used by the engine EN per unit time, e.g., in case of idling at time of stoppage of the vehicle or low-speed running. As a result of this, the check valve CV does not sufficiently open and repeatedly opens and closes. This causes the check valve CV to generate abnormal noise or badly wear.

On the other hand, the use of the pressure adjuster 5 allows the valve member 18 to be brought into the open state by the pressure of the fuel inside of the upstream pressure chamber UP, which communicates with the upstream path SL1, even in a case where the amount of fuel that is discharged from the fuel pump FP is small and the pressure of the fuel inside of the supply path SL is low, because the area of the pressure-receiving surface 44 is comparatively large. As a result of this, a total amount of fuel that is used by the engine EN and fuel that is discharged into the discharge path 50 passes through the check valve CV. This configuration makes it possible to sufficiently open the check valve CV. This makes it possible to reduce abnormal noise from the check valve CV and wearing of the check valve CV.

Next, when the vehicle shifts from a driven state in which the vehicle is being driven to a stopped state in which the vehicle is stopped and no fuel is used by the engine EN, the pump controller PC performs a pressure-raising process on fuel remaining in the supply path SL. In a case where the pressure of the fuel inside of the supply path SL is low, a temperature of fuel located near the high-pressure pump HP is raised by heat generated in the high-pressure pump HP, so that bubbles are highly likely to be generated in the fuel. The pressure-raising process is a process for suppressing a decrease in the pressure of the fuel inside of the downstream path SL2 during stoppage of the fuel pump FP.

Specifically, when the vehicle shifts from the driven state to the stopped state, the pump controller PC drives the fuel pump FP to supply fuel to the supply path SL. At this occasion, the valve member 18 of the pressure adjuster 5 is maintained in the open state. Since the amount of fuel that the jet pump 60 discharges per unit time is determined in advance, an increase in the amount of fuel that is discharged from the fuel pump FP leads to a rise in the pressure of the fuel inside of the supply path SL. The pump controller PC stops the fuel pump FP after driving the fuel pump FP at a predetermined rotation rate for a predetermined period of time. In a state where the fuel pump FP has been stopped, the respective pressures of the fuel inside of the upstream path SL1, the upstream line UL, the upstream pressure chamber UP, and the discharge path 50 decrease to an internal pressure inside of the fuel tank FT.

Meanwhile, the flow of the fuel from the fuel pump FP toward the engine EN through the supply path SL stops, and the check valve CV closes. For this reason, the respective pressures of the fuel inside of the downstream path SL2 and the downstream line LL do not decrease to the internal pressure inside of the fuel tank FT. Meanwhile, the downstream path SL2 and the downstream line LL communicate with the downstream pressure chamber LP. For this reason, in a case where the pressures of the fuel inside of the downstream path SL2 and the downstream line LL are equal to or higher than a predetermined pressure, the force applied to the pressure-receiving surface 38 from the fuel inside of the downstream pressure chamber LP becomes higher than the biasing force of the coil spring 16, so that the pressure adjustment valve 10 is maintained in the open state. On the other hand, when the pressures of the fuel inside of the downstream path SL2 and the downstream line LL become equal to the predetermined pressure, the force applied to the pressure-receiving surface 38 from the fuel inside of the downstream pressure chamber LP becomes lower than the biasing force of the coil spring 16. This places the pressure adjustment valve 10 in the closed state, thus making it possible to prevent the fuel inside of the downstream path SL2 and the downstream line LL from being discharged into the discharge path 50. As a result of this, the pressures of the fuel inside of the downstream path SL2 and the downstream line LL are maintained at the predetermined pressure. This configuration makes it possible to maintain the pressure of the fuel inside of the downstream path SL2 at a desired pressure in a case where the fuel pump FP is in the stopped state. This makes it possible to suppress the generation of bubbles in the fuel inside of the downstream path SL2.

Second Embodiment

Figure 4:
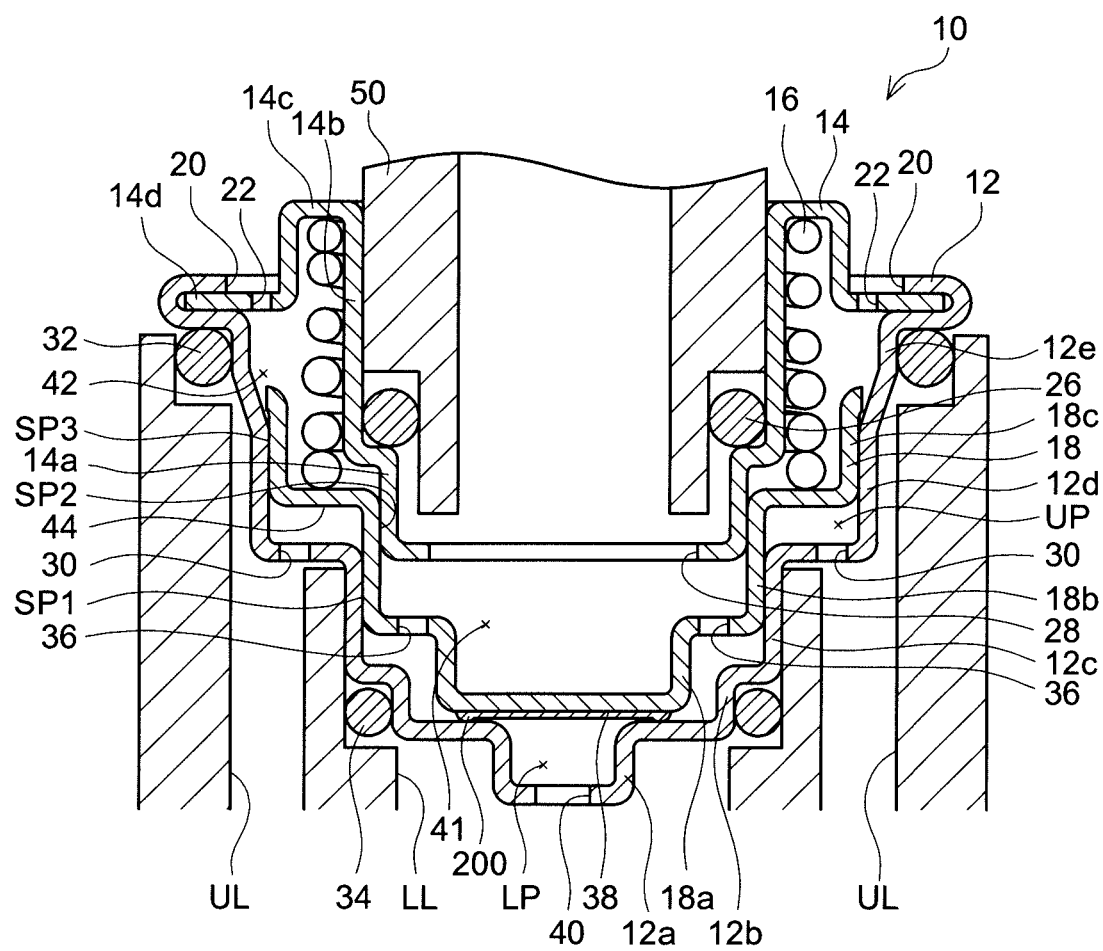
FIG. 4 is a longitudinal sectional view of a pressure adjustment valve in a closed state according to a second embodiment.

Points of difference from the first embodiment are described with reference to FIG. 4. In the second embodiment, a pressure adjustment valve 10 is different in configuration from the pressure adjustment valve 10 of the first embodiment. The pressure adjustment valve 10 of the second embodiment has a seal member 200 attached to the lower surface of the bottom of the section 18a of the valve member 18. The seal member 200 is made of a material such as rubber. The seal member 200 has an annular shape. The seal member 200 makes contact with the upper surface of the bottom of the section 12b of the casing 12 in a case where the valve member 18 is in the closed state. This configuration makes it possible to suppress a leakage of fuel from the downstream pressure chamber LP into the space 41 in a case where the valve member 18 is in the closed state.

Third Embodiment

Figure 5:
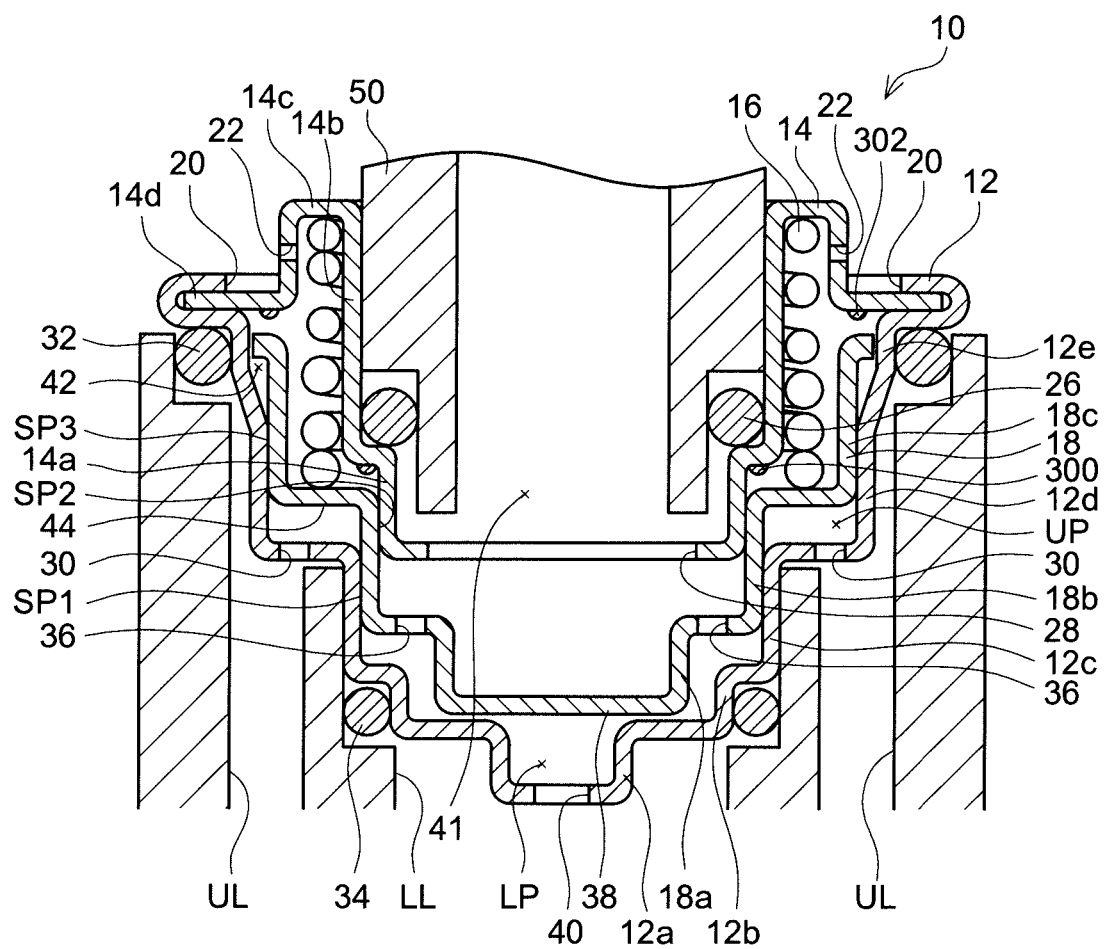
FIG. 5 is a longitudinal sectional view of a pressure adjustment valve in an open state according to a third embodiment.

Points of difference from the first embodiment are described with reference to FIG. 5. In the third embodiment, a pressure adjustment valve 10 is different in configuration from the pressure adjustment valve 10 of the first embodiment. The pressure adjustment valve 10 of the third embodiment has a seal member 300 attached to a lower surface of the bottom of the section 14b of the casing 14. The seal member 300 is made of a material such as rubber. The seal member 300 has an annular shape. The seal member 300 makes contact with the upper surface of the bottom of the section 18c of the valve member 18 in a case where the valve member 18 is in the open state. This configuration makes it possible to suppress the flowing out of fuel from the space 41 into the space 42 through the slide position SP2 where the valve member 18 and the casing 14 slide on each other.

The pressure adjustment valve 10 of the third embodiment further has a seal member 302 attached to a lower surface of a bottom of the inserted portion 14d of the casing 12. The seal member 302 is made of a material such as rubber. The seal member 302 has an annular shape. The seal member 302 makes contact with an upper end of the valve member 18 in a case where the valve member 18 is in the open state. This configuration makes it possible to suppress the flowing out of fuel from the upstream pressure chamber UP into the space 42 through the slide position SP3 where the valve member 18 and the casing 12 slide on each other.

Fourth Embodiment

Figure 6:
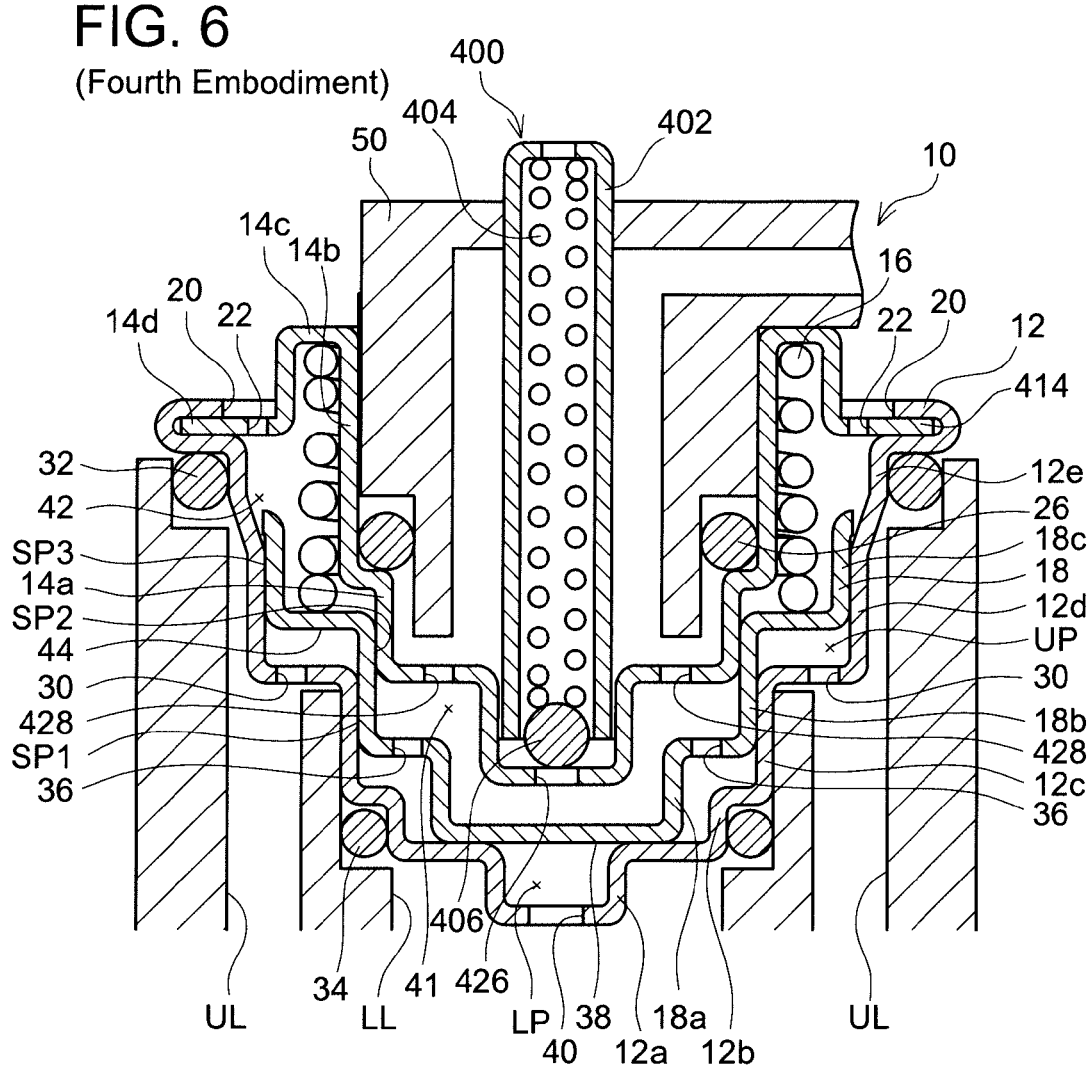
FIG. 6 is a longitudinal sectional view of a pressure adjustment valve in a closed state according to a fourth embodiment.

Points of difference from the first embodiment are described with reference to FIG. 6. A pressure adjustment valve 5 of the fourth embodiment includes a relief valve 400. The relief valve 400 is attached to the discharge path 50.

The relief valve 400 includes a housing 402, a valve member 406, and a coil spring 404. The housing 402 is fixed to the discharge path 50 in a vicinity of its upper end. The housing 402 is disposed through the discharge path 50 from the upper end of the casing 14 into the pressure adjustment valve 10. The housing 402 has a cylindrical shape extending in the up-and-down direction within the pressure adjustment valve 10. The housing 402 has its lower end disposed at the lower end of the casing 14. The valve member 406 is disposed at a lower end of the housing 402. The valve member 406 has a spherical shape. The valve member 406 is disposed at a through-hole 426 disposed at the lower end of the casing 14. The coil spring 404 is disposed at an upper end of the valve member 406. The coil spring 404 extends in the up-and-down direction within the housing 402. The coil spring 404 biases the valve member 406 toward the through-hole 426. This causes the through-hole 426 to be closed by the valve member 406.

In a case where the valve member 18 is in the open state, when the pressure of the space 41, i.e., the pressure inside of the supply path SL reaches a predetermined pressure, the valve member 406 moves away from the through-hole 426, so that the through-hole 426 opens. This causes the fuel inside of the space 41 to pass upward through the inside of the housing 402 to be discharged through an upper end of an inside of the housing 402 into the fuel tank FT. This configuration makes it possible to prevent the pressure of the fuel inside of the supply path SL from becoming high. Further, when the valve member 18 is in the open state, the fuel inside of the space 41 reaches the discharge path 50 through through-holes 428 passing through the bottom of the section 14a of the casing 14.

Figure 7:
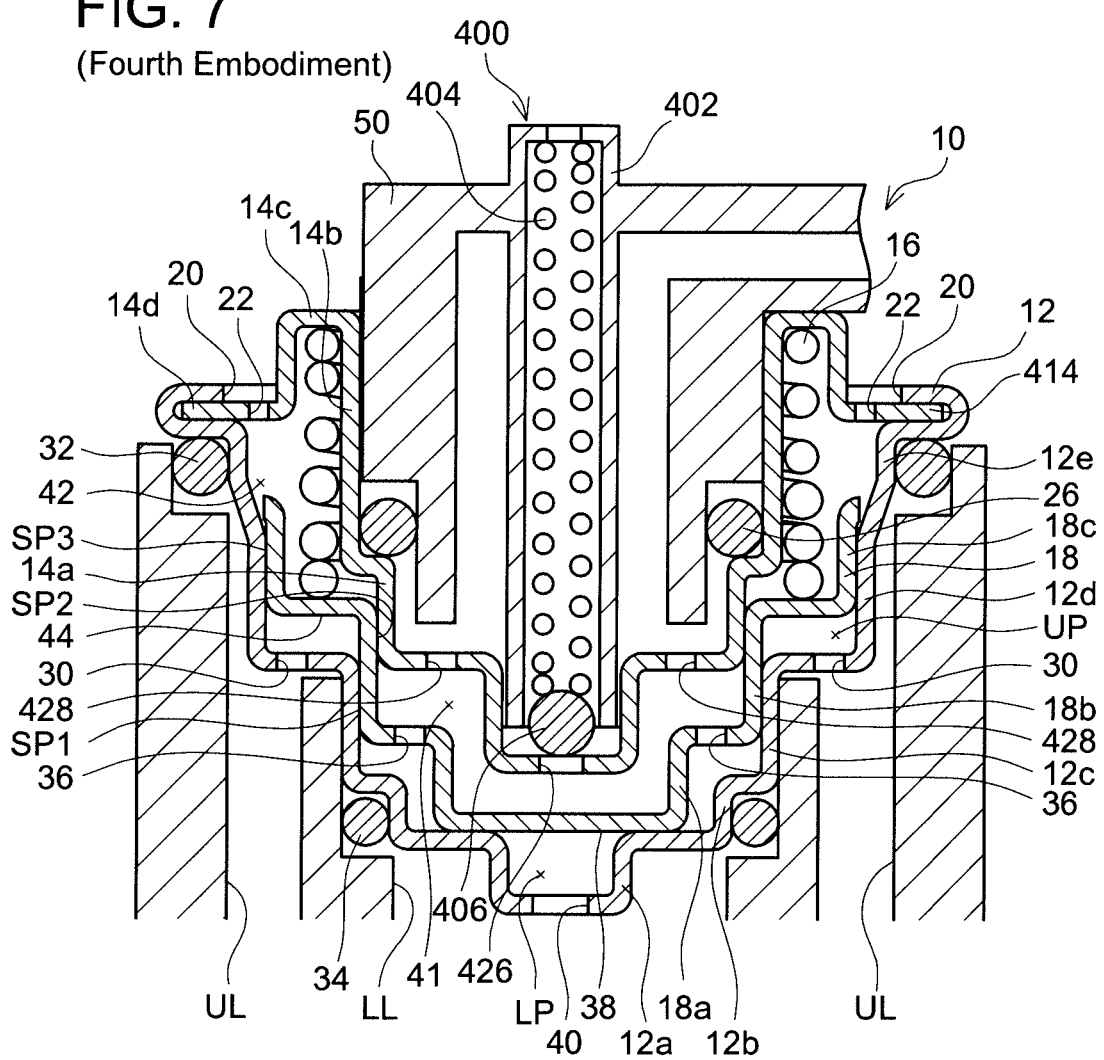
FIG. 7 is a longitudinal sectional view of a pressure adjustment valve in a closed state according to a modification.

It should be noted that, as shown in FIG. 7, the housing 402 of the relief valve 400 may be integrally formed with the discharge path 50.

Further, a relief valve configured to adjust the pressure of the fuel inside of the supply path SL is not limited to the relief valve 400. For example, the relief valve may be spaced away from the pressure adjuster 5.

Fifth Embodiment

Figure 8:
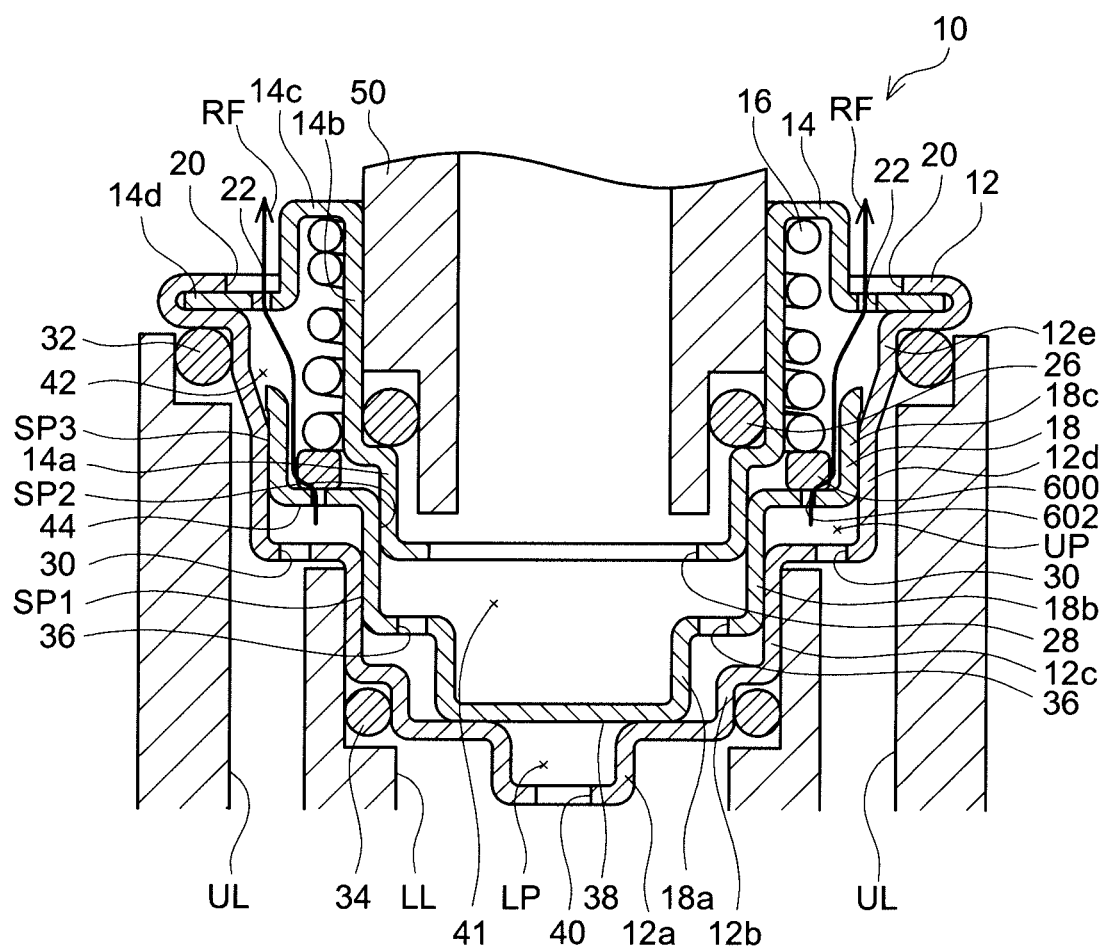
FIG. 8 is a longitudinal sectional view of a pressure adjustment valve in a closed state according to a fifth embodiment.

Points of difference from the first embodiment are described with reference to FIG. 8. In the fifth embodiment, a pressure adjustment valve 10 is different in configuration from the pressure adjustment valve 10 of the first embodiment. The pressure adjustment valve 10 of the fifth embodiment includes a relief valve 600. The relief valve 600 is disposed between the upper surface of the bottom of the section 18c of the valve member 18 and the coil spring 16. The relief valve 600 is caused by the coil spring 16 to bias the bottom of the section 18c toward upper ends of through-holes 602. The through-holes 602 allow the upstream pressure chamber UP and the space 42 to communicate with each other. The relief valve 600 is biased by the coil spring 16 to close the through-holes 602. When the pressure of the fuel inside of the upstream pressure chamber UP, i.e., the pressure of the fuel inside of the supply path SL reaches the predetermined pressure, the relief valve 600 moves away from the through-holes 602, so that the through-holes 602 open. This causes the fuel inside of the upstream pressure chamber UP to pass upward through the space 42 as indicated by an arrow in FIG. 8 to be discharged through the communication holes 22 into the fuel tank FT.

An area of a pressure-receiving surface of the relief valve 600, which receives the pressure of the fuel inside of the upstream pressure chamber UP, is smaller than the area of the pressure-receiving surface 44. For this reason, the pressure of the fuel inside of the upstream pressure chamber UP during the shift of the valve member 18 to the open state is lower than the pressure of the fuel inside of the upstream pressure chamber UP during the movement of the relief valve 600 away from the through-holes 602. For this reason, in a situation where the relief valve 600 moves away from the through-holes 602, the valve member 18 is in the open state and the fuel is being supplied from the fuel pump FP to the engine EN. This configuration makes it possible to prevent the pressure of the fuel inside of the supply path SL from becoming high in the situation where the fuel is being supplied from the fuel pump FP to the engine EN.

Sixth Embodiment

Figure 9:
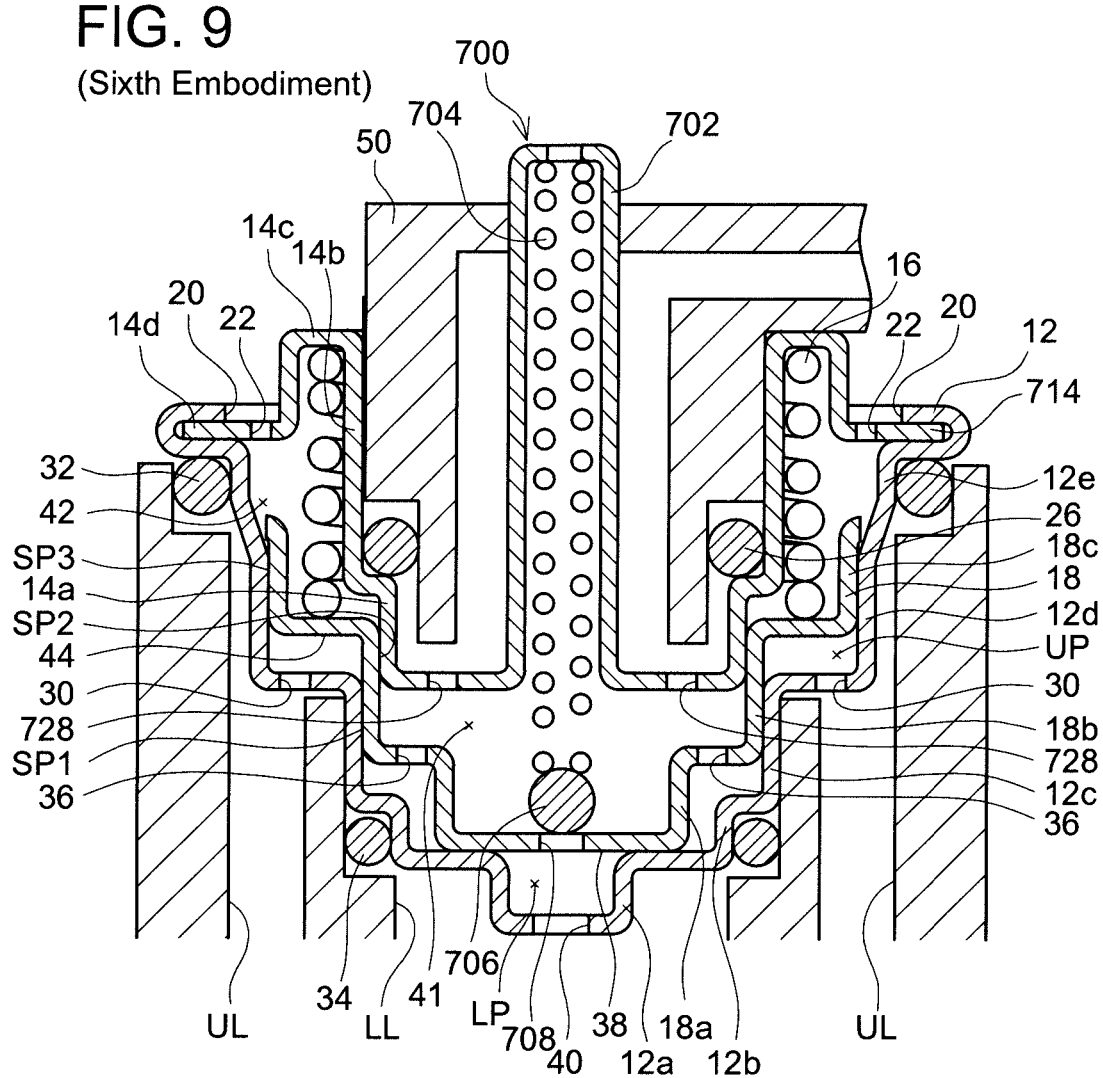
FIG. 9 is a longitudinal sectional view of a pressure adjustment valve in a closed state according to a sixth embodiment.

Points of difference from the first embodiment are described with reference to FIG. 9. In the sixth embodiment, a pressure adjustment valve 10 is different in configuration from the pressure adjustment valve 10 of the first embodiment. The pressure adjustment valve 10 of the sixth embodiment includes a relief valve 700. The relief valve 700 is disposed in the casing 14.

The relief valve 700 includes a housing 702, a valve member 706, and a coil spring 704. The housing 702 is integrally formed with the casing 14. The housing 702 has a cylindrical shape extending upward from the bottom of the section 14a of the casing 14. The housing 702 protrudes out of the pressure adjuster 5 through the discharge path 50. The valve member 706 is disposed at a lower end of the housing 702. The valve member 706 has a spherical shape. The valve member 706 is disposed at a through-hole 708 disposed at the bottom of the section 18a of the valve member 18. The coil spring 704 is disposed at an upper end of the valve member 706. The coil spring 704 extends in the up-and-down direction within the housing 702. The coil spring 704 biases the valve member 706 toward the through-hole 708. This causes the through-hole 708 to be closed by the valve member 706.

When the pressure inside of the downstream pressure chamber LP, i.e., inside of the supply path SL reaches the predetermined pressure, the valve member 706 moves away from the through-hole 708, as a result of which the through-hole 708 opens. This causes the fuel inside of the downstream pressure chamber LP to pass upward through an inside of the housing 702 to be discharged through an upper end of the inside of the housing 702 into the fuel tank FT. This configuration makes it possible to prevent the pressure of the fuel inside of the supply path SL from becoming high in a case where the valve member 18 is in the closed state. For example, when the pump controller PC performs the pressure-raising process, the fuel inside of the supply path SL can be discharged into the fuel tank FT with the valve member 18 maintained in the closed state.

It should be noted that in a case where the valve member 18 is in the open state, the fuel inside of the space 41 reaches the discharge path 50 through through-holes 728 passing through the bottom of the section 14a of the casing 14.

Seventh Embodiment

Figure 10:
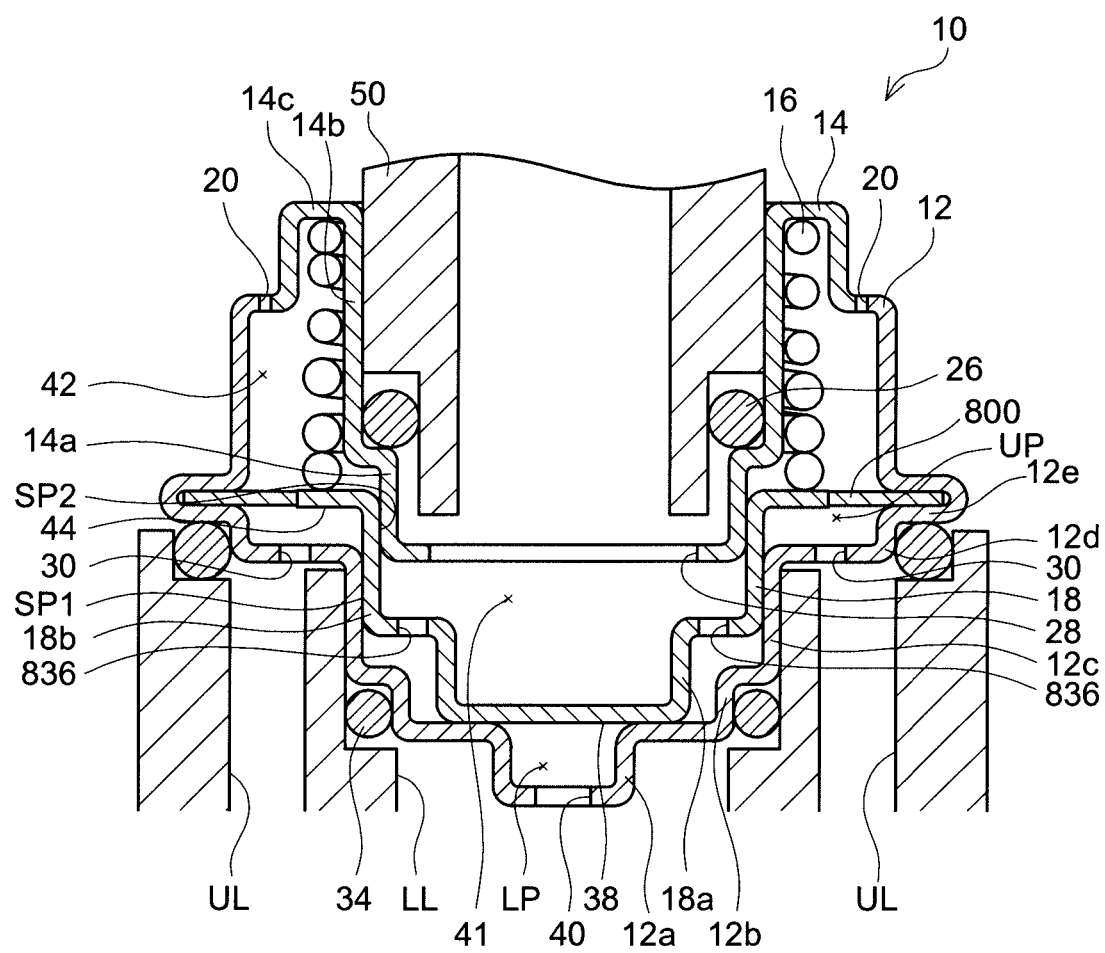
FIG. 10 is a longitudinal sectional view of a pressure adjustment valve in a closed state according to a seventh embodiment.

Points of difference from the first embodiment are described with reference to FIG. 10. In the seventh embodiment, a pressure adjustment valve 10 is different in configuration from the pressure adjustment valve 10 of the first embodiment. Further, in comparison with the first embodiment, the valve member 18 has no section 18c. The pressure adjustment valve 10 of the seventh embodiment has a diaphragm 800 disposed on an outer circumferential side of the section 18b of the valve member 18. The diaphragm 800 has an annular shape. The diaphragm 800 has its inner circumferential edge fixed to the valve member 18. The diaphragm 800 has its outer circumferential edge secured by the casing 12. The diaphragm 800 constitutes an upper surface of the upstream pressure chamber UP. In this configuration, the upstream pressure chamber UP is defined by the diaphragm 800, the valve member 18, and the casing 12. The diaphragm 800 warps by the pressure of the fuel inside of the upstream pressure chamber UP. This causes the valve member 18 to shift from the closed state to the open state.

Further, the casing 12 and the casing 14 are integrally formed.

This configuration makes it possible to isolate the upstream pressure chamber UP and the space 42 from each other using the diaphragm 800. This makes it possible to, while maintaining the upstream pressure chamber UP liquid-tight, allow the valve member 18 to be capable of moving up and down.

For example, the seal member 200 of the second embodiment may be attached to any of the valve members 18 of the other embodiments. Further, at least one of the aforementioned seal members 300 and 302 may be disposed in any of the casings 14 of the other embodiments.

Furthermore, two or more of the relief valves 400 to 600 respectively described in the fourth to sixth embodiments may be disposed in one pressure adjuster 5. Further, one or more of the relief valves 400 to 600 respectively described in the fourth to sixth embodiments may be disposed in the pressure adjuster 5 described in the seventh embodiment.

Figure 11:
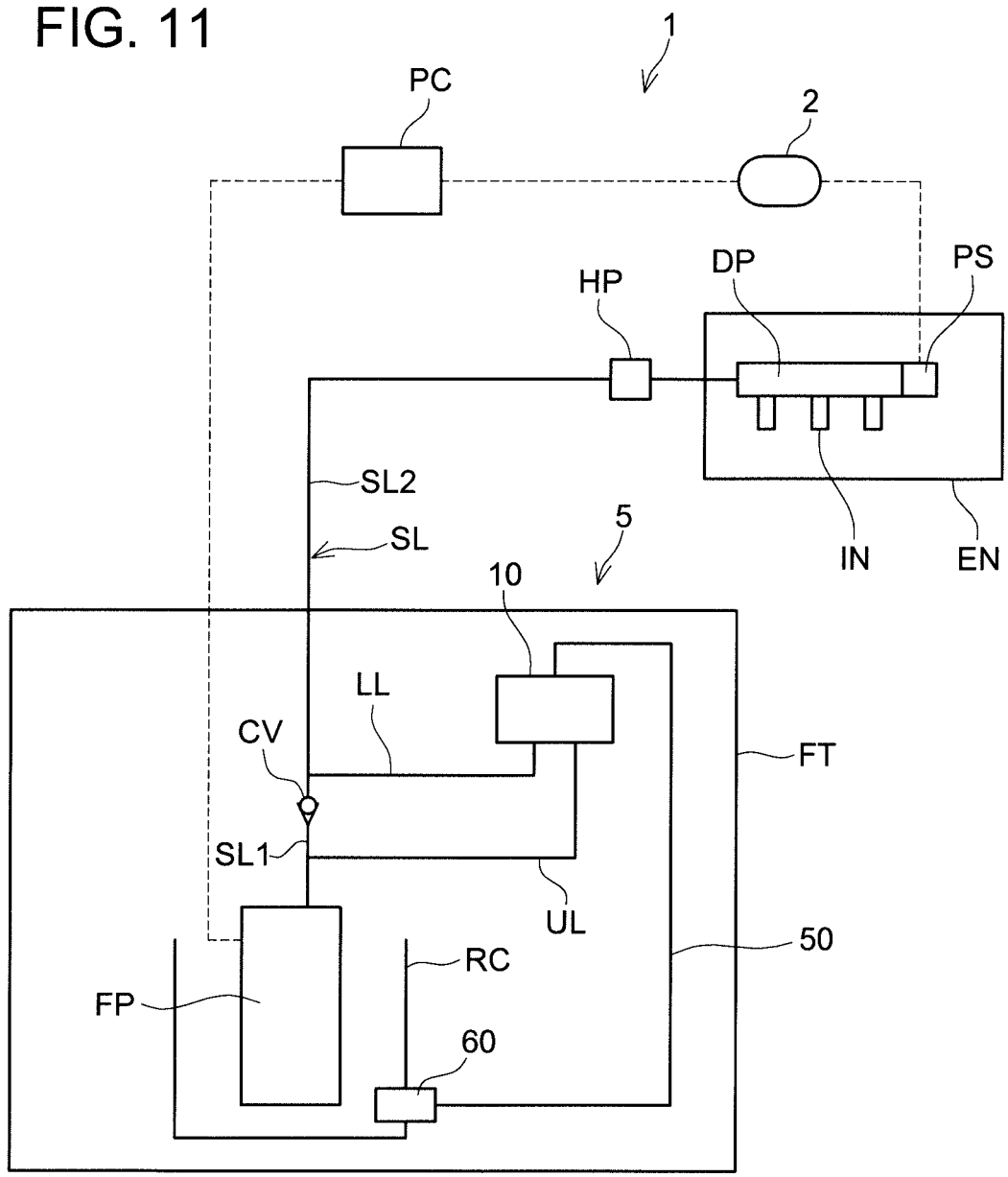
FIG. 11 is a schematic view of a fuel supply system according to a modification.

Further, in each of the embodiments described above, each fuel supply system 1 includes the high-pressure pump HP. However, as shown in FIG. 11, the fuel supply system 1 may include no high-pressure pump HP. In this case, the pressure sensor PS may be disposed in the delivery pipe DP to detect pressure of fuel inside of the delivery pipe DP. This configuration, too, can bring about effects that are similar to those which are brought about by the embodiments described above.

What is claimed is:

1. A pressure adjuster configured to connect with a supply path connecting a fuel supply device and a fuel use device, the fuel supply device being configured to change a supply amount of fuel per unit time, and the supply path including a check valve configured to allow fuel to flow in the supply path from the fuel supply device to the fuel use device and inhibits fuel from flowing in the supply path from the fuel use device to the fuel supply device, the pressure adjuster comprising:
a casing;
a pressure chamber disposed in the casing and communicating with the supply path located on a side closer to the fuel supply device than the check valve;
a communication chamber disposed in the casing and communicating with the supply path located on a side closer to the fuel use device than the check valve, and isolated from the pressure chamber;
a valve member disposed in the casing, including a first pressure-receiving surface and configured to switch between an open state and a closed state by pressure of fuel inside of the pressure chamber at the first pressure-receiving surface;
a discharge path communicating with the communication chamber and configured to discharge fuel flowing from the communication chamber to outside of the casing when the valve member is in the open state, and the discharge path being isolated from the pressure chamber; and a constriction portion disposed in the discharge path and configured to constrict a cross section area of the discharge path.

2. The pressure adjuster as in claim 1, wherein
the valve member comprises a valve portion integrally connected to the first pressure-receiving surface and disposed between the communication chamber and the discharging path.

3. The pressure adjuster as in claim 2, wherein
the valve member is configured to slide along an inner circumference surface of the casing in the casing,
the casing comprises a contact portion configured to make contact with the valve member when the valve member is in the open state, and
the contact portion comprises a seal portion disposed on a downstream side of the valve member and a downstream side of a slide part where the valve member slides on the casing.

4. The pressure adjuster as in claim 1, further comprising
a warping member connecting an inner circumference surface of the casing and the valve member and configured to warp by pressure of fuel inside of the pressure chamber, wherein
the pressure chamber is defined by the casing, the warping member and the valve member.

5. The pressure adjuster as in claim 1, wherein
the constriction portion comprises a jet pump configured to intake fuel outside of the jet pump and discharge the fuel to the outside by utilizing a velocity of fuel flowing from the discharge path into the jet pump.

6. The pressure adjuster as in claim 1, further comprising
a first relief valve disposed in the casing and configured to adjust pressure of fuel inside of the discharge path.

7. The pressure adjuster as in claim 5, further comprising
a second relief valve configured to adjust pressure of fuel inside of the pressure chamber.

8. The pressure adjuster as in claim 1, further comprising:
a second relief valve configured to adjust pressure of fuel inside of the pressure chamber.

9. The pressure adjuster as in claim 1, wherein
the valve member further includes a second pressure-receiving surface configured to receive pressure of fuel inside of the communication chamber, and
the first pressure-receiving surface is larger than the second pressure-receiving surface.

* * * * *